United States Patent [19]

Dwivedi et al.

[11] Patent Number: 5,526,914

[45] Date of Patent: Jun. 18, 1996

[54] BRAKE ROTORS, CLUTCH PLATES AND LIKE PARTS AND METHODS FOR MAKING THE SAME

[75] Inventors: Ratnesh K. Dwivedi, Wilmington; Thomas M. Gray, Bear; Michael J. Hollins, Newark; Virgil Irick, Jr., Hockessin, all of Del.

[73] Assignee: Lanxide Technology Company, LP, Newark, Del.

[21] Appl. No.: 226,612

[22] Filed: Apr. 12, 1994

[51] Int. Cl.⁶ ..................................................... F16D 69/02
[52] U.S. Cl. .............................. 192/107 M; 188/218 XL
[58] Field of Search ..................... 192/107 M; 188/218 L

[56] References Cited

U.S. PATENT DOCUMENTS

| | | |
|---|---|---|
| 2,999,564 | 9/1961 | Frichette, Jr. . |
| 3,364,976 | 1/1968 | Reding et al. . |
| 3,547,180 | 12/1970 | Cochran et al. . |
| 3,718,441 | 2/1973 | Landingham . |
| 3,724,613 | 4/1973 | Sermingham . |
| 3,791,493 | 2/1974 | Yamaguchi et al. . |
| 3,915,699 | 10/1975 | Umehara et al. . |
| 3,970,136 | 7/1976 | Cannell et al. . |
| 4,180,622 | 12/1979 | Burkhard et al. ............... 192/107 M X |
| 4,290,510 | 9/1981 | Warren ............................ 192/107 M X |
| 4,341,840 | 7/1982 | Prewo . |
| 4,345,678 | 8/1982 | Ritsema . |
| 4,404,262 | 9/1983 | Watmough . |
| 4,409,298 | 10/1983 | Albertson et al. . |
| 4,473,103 | 9/1984 | Kenney et al. . |
| 4,552,259 | 11/1985 | Albertson ......................... 192/107 M |
| 4,713,360 | 12/1987 | Newkirk et al. . |
| 4,753,690 | 6/1988 | Wada et al. . |
| 4,759,995 | 7/1988 | Skibo et al. . |

(List continued on next page.)

FOREIGN PATENT DOCUMENTS

| | | |
|---|---|---|
| 0351237 | 10/1993 | European Pat. Off. . |
| 2700112 | 7/1978 | Germany . |
| 2249558 | 5/1992 | United Kingdom . |

OTHER PUBLICATIONS

R. Ostvik and W. Ruch, "*Frictiopn and Wear Properties of Alminium Matrix Composites*," Proceedings of the International Conference On Light Metals: Advanced Aluminium and Magnesium Alloys (Eds. T. Kahn and G. Effenberg), pp. 675–685, date and location of conference: Jun. 20–22, 1990, Amsterdam, The Netherlands, ASM Europe, Rue de L'Orme 19, 1040 Brussels, Belgium.

R. Ostvik and S. Brusetuang, "*Some Results from Development of Al PMMC Materials for Tribological Application*," 9th Annual SAE [Society of Automotive Engineers, Warrandale, PA] Brake Colloquium and Engineering Display, date and location of conference: Oct. 13–16, New Orleans, Louisiana, USA (transcript of presentation provided by R. Ostvik, Senior Research Scientist, SINTEF, The Foundation for Scientific and Industrial Research of the Norwegian Institute of Technology, N–7034 Trondheim, Norway).

(List continued on next page.)

*Primary Examiner*—Rodney H. Bonck
*Attorney, Agent, or Firm*—Jeffrey R. Ramberg

[57] ABSTRACT

This invention relates to metal and metal matrix composite materials that are useful as, for example, brake rotors, clutch plates and other similar uses which benefit from material properties of the invention. In the case of metal matrix composite materials, clutch plates and brake rotors made according to the invention comprise an interconnected matrix metal embedding at least one filler material. For example, the at least one filler material comprises numerous acceptable filler materials present in a sufficient quantity to provide desired performance. The brake rotors and clutch plates according to the invention further comprise a coating on the surface thereof causing the metal or metal matrix composite body to function as a substrate. The coatings may be applied by various conventional techniques. Desirable results of placing a coating on a metal or metal matrix composite substrate brake rotor or clutch plate include a significant increase in the maximum operating temperature of the brake rotor or clutch plate and/or a significant reduction in weight in comparison to conventional materials, etc.

11 Claims, 2 Drawing Sheets

U.S. PATENT DOCUMENTS

| | | |
|---|---|---|
| 4,818,734 | 4/1989 | Kantner et al. . |
| 4,828,008 | 5/1989 | White et al. . |
| 4,851,375 | 7/1989 | Newkirk et al. . |
| 4,862,945 | 9/1989 | Greanias et al. . |
| 4,865,806 | 9/1989 | Skibo et al. . |
| 4,871,008 | 10/1989 | Dwivedi et al. . |
| 4,930,606 | 6/1990 | Sporzynski et al. . |
| 4,935,055 | 6/1990 | Aghajanian et al. . |
| 4,940,679 | 7/1990 | Claar et al. . |
| 4,961,461 | 10/1990 | Klier et al. . |
| 4,998,578 | 3/1991 | Dwivedi et al. . |
| 5,000,247 | 3/1991 | Burke . |
| 5,017,526 | 5/1991 | Newkirk et al. . |
| 5,028,392 | 7/1991 | Lloyd et al. . |
| 5,028,494 | 7/1991 | Tsujimura et al. . |
| 5,040,588 | 8/1991 | Newkirk et al. . |
| 5,042,561 | 8/1991 | Chandley . |
| 5,141,819 | 8/1992 | Aghajanian et al. . |
| 5,143,192 | 9/1992 | Vojacek et al. ............... 192/107 M |
| 5,188,164 | 2/1993 | Kantner et al. . |
| 5,225,069 | 7/1993 | Haupt et al. ............... 205/325 |
| 5,281,481 | 1/1994 | Hayward ............... 192/107 M X |
| 5,364,522 | 11/1994 | Wang ............... 205/50 |

OTHER PUBLICATIONS

S. Kennerknecht, Cercast Group, "MCC Studies via the Investment Casting Process", The Materials Information Society, Montreal, Quebec, Canada, Sep. 17–29, 1990, pp. 87–100.

"Cast Aluminum–Matrix Composites for Automotive Applications", Pradeep Rohatgi, JOM Apr. 1991, pp. 10–15.

D. E. Hammond, "Castable Composites Target New Applications", Modern Casting, vol. 80, No. 9, pp. 27–30, Sep. 1990, American Foundrymen's Society, Inc., Des Plaines, IL.

L. H. McCarty, *Metal Matrix Composite Cuts Race Car's Unsprung Weight*," DESIGN NEWS, pp. 168–9, Oct. 1990, Cahners Publishing Company, Inc., Newton, MA.

BRAKE ROTORS, CLUTCH PLATES AND LIKE PARTS AND METHODS FOR MAKING THE SAME

FIELD OF THE INVENTION

This invention relates to metal and metal matrix composite materials that are useful as, for example, brake rotors, clutch plates and other similar uses which benefit from material properties of the invention. In the case of metal matrix composite materials, clutch plates and brake rotors made according to the invention comprise an interconnected matrix metal embedding at least one filler material. For example, the at least one filler material comprises numerous acceptable filler materials present in a sufficient quantity to provide desired performance. The brake rotors and clutch plates according to the invention further comprise a coating on the surface thereof causing the metal or metal matrix composite body to function as a substrate. The coatings may be applied by various conventional techniques. Desirable results of placing a coating on a metal or metal matrix composite substrate brake rotor or clutch plate include a significant increase in the maximum operating temperature of the brake rotor or clutch plate and/or a significant reduction in weight in comparison to conventional materials, etc.

BACKGROUND OF THE INVENTION

Recent efforts to improve the fuel economy and emissions levels of air and ground vehicles have created a need for new materials which can provide weight savings to the vehicle without sacrificing performance levels. The immediate desirability of such materials is enhanced when the weight savings can be achieved by directly substituting the materials for current materials in existing designs. Moreover, the long-term desirability of such materials is maximized when the unique properties of the materials provide the possibility of improved designs and performance for vehicle components.

Traditionally, for example, automotive brake rotors and clutch plates have been made from cast iron which provides good wear resistance and excellent high temperature properties. However, cast iron is dense relative to other candidate materials and, therefore, a cast iron brake rotor or clutch plate is relatively heavy.

Specifically, a heavy brake rotor is considered to be undesirable for at least three reasons. The first reason is that a heavy brake rotor contributes to the overall weight of the vehicle and thus reduces its fuel efficiency and correspondingly increases its emissions levels. The second reason (relevant mainly to passenger cars and trucks) is that a brake rotor is part of the "unsprung" weight of a vehicle (i.e., the weight of a vehicle that is below the springs) and, as such, contributes to the noise, vibration and harshness (commonly known in the automobile industry as "NVH") associated with the operation of the vehicle. When the unsprung weight of a vehicle is reduced, the NVH properties are usually improved. The third reason is that a brake rotor is a part of a vehicle that requires rotation during use and, accordingly, a heavier brake rotor requires the use of additional energy to increase and decrease the rotational speed of the rotor. In addition, the ability of a heavier brake rotor to cause undesirable vibration during rotation is greater than that associated with a lighter brake rotor.

Moreover, a heavy clutch plate is considered to be undesirable for at least two reasons. The first reason is that a heavy clutch plate contributes to the overall weight of a vehicle and thus reduces the fuel efficiency of the vehicle and correspondingly increases emissions levels of the vehicle. The second reason is that the clutch plate is part of the drive train which requires direct rotation by the engine. Thus, a heavier clutch plate requires the use of additional energy to increase and decrease its rotational speed.

The search for desirable materials to replace cast iron in brake rotors and clutch plates has identified several possible candidates and their advantages and limitations. Each of these materials and its relevant advantages and limitations is discussed below.

Steel has been considered as a brake rotor and clutch plate material because of its excellent strength to weight properties. Although denser than cast iron, the superior strength of steel enables the use of smaller brake rotors and clutch plates which could result in weight savings. However, at the present time, the weight savings that have been obtained with steel brake rotors and clutch plates have been minimal.

Titanium has also been considered as a brake rotor and clutch plate material. The excellent strength to weight properties of titanium, as well as its high temperature properties, would enable titanium brake rotors and clutch plates to satisfy all of the requirements discussed above for a desirable brake rotor and/or clutch plate material. However, the high cost of titanium has prevented its widespread use as a brake rotor and/or clutch plate material in most ground applications.

Various polymeric materials have also been considered as brake rotor and clutch plate materials. These materials have the advantage of being relatively inexpensive but they have not been able to achieve the high temperature strength necessary to perform adequately as a brake rotor or clutch plate material.

Various ceramic materials have also been considered as brake rotor and clutch plate materials. Although many ceramic materials have demonstrated excellent wear resistance properties and the ability to withstand extremely high temperatures, the brittle nature of most ceramic materials has precluded the widespread use of ceramic brake rotors and clutch plates. Although the use of new processing techniques and the inclusion of reinforcing materials has created a new generation of ceramic and ceramic matrix composite materials with increased strength and reduced brittleness that perform well as brake rotor and clutch plate materials, the present production cost of such materials relative to other available materials has not been justifiable in many cases. However, some of these new ceramic and ceramic matrix composite materials are being tested for use as brake rotor and clutch plate materials in heavier ground vehicles and/or in vehicles that demand increased performance from their brake rotors and/or clutch plates. In these situations, the higher cost of such materials is justified by their ability to provide increased performance.

Aluminum and magnesium alloys have also been considered as brake rotor and clutch plate materials. These metals show excellent strength to weight properties but their high temperature properties are not adequate for most brake rotor and/or clutch plate applications. Specifically, brake rotor tests using both magnesium and aluminum rotors have demonstrated that unacceptable amounts of surface scoring and rotor warpage occur after repeated braking cycles. These problems can be partially alleviated by incorporating various alloying elements into the magnesium and aluminum metals and/or heat treating the final brake rotors before use. However, the use of such additives and/or techniques raises the cost of the brake rotors and can cause the rotors to display undesirable side effects, such as increased brittleness and high temperature instability. Accordingly, the use of alloying additives and heat treatment techniques, either alone or in combination, has not resulted in commercially viable brake rotors for most of the current brake rotor applications.

Recent attempts to reduce or eliminate the problems associated with using aluminum and magnesium as brake rotor and/or clutch plate materials have been directed toward the production of various types of aluminum and magnesium metal matrix composite materials. These materials generally consist of a metal matrix having embedded therein one or more reinforcing materials. Several techniques for forming metal matrix composites have been developed, some of which use pressure or a vacuum to push or draw a molten metal into a mass or preform of reinforcing material (hereinafter sometimes referred to as "filler material" or "filler"). Other techniques for forming metal matrix composite materials do not require the use of pressure or a vacuum to enable the molten metal to infiltrate the filler material. Such infiltration techniques are sometimes referred to as "spontaneous infiltration" techniques. Representative methods for forming metal matrix composites and/or casting metals can be found in the following Patents:

U.S. Pat. No. 5,028,392, which issued on Jul. 2, 1991, in the names of Lloyd et al., and entitled "Melt Process For the Production of Metal-Matrix Composite Materials With Enhanced Particle/Matrix Wetting";

U.S. Pat. No. 5,028,494, which issued on Jul. 2, 1991, in the names of Tsujimura et al., and entitled "Brake Disk Material For Railroad Vehicles";

U.S. Pat. No. 4,865,806, which issued on Sep. 12, 1989, in the names of Skibo et al., and entitled "Process For Preparation of Composite Materials Containing Nonmetallic Particles In A Metallic Matrix";

U.S. Pat. No. 4,759,995, which issued on Jul. 26, 1988, in the names of Skibo et al., and entitled "Process For Production of Metal Matrix Composites By Casting and Composite Therefrom";

U.S. Pat. No. 4,961,461, which issued on Oct. 9, 1990, in the names of Klier et al., and entitled "Method and Apparatus For Continuous Casting of Composites";

U.S. Pat. No. 4,473,103, which issued on Sep. 25, 1984, in the names of Kenney et al., and entitled "Continuous Production of Metal Alloy Composites";

U.S. Pat. No. 4,404,262, which issued on Sep. 13, 1983, in the name of Watmough, and entitled "Composite Metallic and Refractory Article and Method of Manufacturing the Article";

U.S. Pat. No. 3,970,136, which issued on Jul. 20, 1976, in the names of Cannell et al., and entitled "Method of Manufacturing Composite Materials";

U.S. Pat. No. 3,915,699, which issued on Oct. 28, 1975, in the names of Umehara et al., and entitled "Method For Producing Metal Dies or Molds Containing Cooling Channels By Sintering Powdered Metals";

U.S. Pat. No. 3,718,441, which issued on Feb. 27, 1973, in the name of Landingham, and entitled "Method For Forming Metal-Filled Ceramics of Near Theoretical Density";

U.S. Pat. No. 5,042,561, which issued on Aug. 27, 1991, in the name of Chandley and entitled "Apparatus and Process for Countergravity Casting of Metal With Air Exclusion";

U.S. Pat. No. 4,862,945, which issued on Sep. 5, 1989, in the names of Greanias et al. and entitled "Vacuum Countergravity Casting Apparatus and Method With Backflow Valve";

U.S. Pat. No. 3,547,180, which issued on Dec. 15, 1970, in the name of Cochran, and entitled "Production of Reinforced Composites"; and U.S. Pat. No. 3,364,976, which issued on Jan. 23, 1968, in the names of Reding et al., and entitled "Method of Casting Employing Self-Generated Vacuum".

The entire disclosures of all of the above-listed U.S. Patents are expressly incorporated herein by reference.

An example of a metal matrix composite brake rotor can be found in U.S. Pat. No. 5,028,494, which issued on Jul. 2, 1991, in the names of Tsujimura et al. (hereinafter referred to as the '494 Patent). In the '494 Patent, an aluminum composite material is produced as a brake disk material for railroad vehicles. In the method of the '494 Patent, reinforcement particles of alumina, silicon carbide, mica or the like are dispersed and mixed into a molten aluminum alloy. The reinforcement particles are 5 to 100 microns in diameter, and are dispersed uniformly in the alloy in an amount of 1 to 25% by weight (i.e., about 0.7% to about 18.4% by volume for alumina reinforcement material; about 0.8% to about 22.0% by volume for silicon carbide reinforcement material and about 1.0% to about 25.7% by volume for mica reinforcement material). It is stated in the '494 Patent that the brake disk material produced by the method disclosed in the 3 494 Patent is "light in weight and has high strength, good thermal conductivity and high wear resistance."

Thus, it can be deduced from the above information that metal matrix composite materials are currently being examined and tested for use as brake rotor materials. Moreover, it should be noted that the metal matrix composite brake rotors currently being produced for the railroad vehicle industry (as evidenced by the '494 Patent) use an aluminum metal matrix with a reinforcement material loading of up to about 26% by volume.

It has been unexpectedly discovered that the performance of brake rotors and clutch plates made from a substrate material comprising a metal or metal matrix composite material can be enhanced by placing an appropriate coating thereon. Specifically, such coatings tend to ameliorate unacceptable surface scoring (e.g., surface disfigurements, such as scratches or grooves) after fade tests have been performed on the brake rotor. The present invention enhances the maximum operating temperature of substrate metal and metal matrix composite materials.

Accordingly, the increasing demand for higher fuel efficiency and reduced emissions has created a need for brake rotors and clutch plates on ground vehicles that are capable of satisfying current performance requirements while providing weight savings to the overall vehicle with respect to the brake rotors and clutch plates currently in use. The present invention provides brake rotors and clutch plates that can satisfy these needs.

Description of Commonly Owned Patents and Patent Applications

A novel method of making a metal matrix composite material is disclosed in Commonly Owned and Copending U.S. patent application Ser. No. 08/078,146, filed Jun. 16, 1993, as a continuation of U.S. patent application Ser. No. 07/933,609, filed Aug. 21, 1992 (now abandoned), which is a continuation of U.S. patent application Ser. No. 07/725, 400, filed on Jul. 1, 1991, now abandoned, as a continuation of U.S. patent application Ser. No. 07/504,074, filed on Apr.

3, 1990, now abandoned, as a continuation of U.S. patent application Ser. No. 07/269,251, filed on Nov. 9, 1988, now abandoned, as a continuation of Commonly Owned U.S. Pat. No. 4,828,008, which issued on May 9, 1989, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned and Copending U.S. patent application Ser. No. 07/934,823, filed on Aug. 24, 1992, as a continuation of Commonly Owned U.S. Pat. No. 5,141,819, entitled "Method of Making Metal Matrix Composite with the Use of a Barrier", which issued Aug. 25, 1992, in the names of Michael K. Aghajanian et al. from U.S. patent application Ser. No. 07/415,088, filed on Sep. 29, 1989, now abandoned, which was a continuation of Commonly Owned U.S. Pat. No. 4,935,055, which issued on Jun. 19, 1990, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. patent application Ser. No. 07/994,064, filed on Dec. 18, 1992, which is a continuation of U.S. patent application Ser. No. 07/759,745, filed on Sep. 12, 1991, now abandoned, as a continuation of U.S. patent application Ser. No. 07/517,541, filed on Apr. 24, 1990, now abandoned, which was a continuation of U.S. patent application Ser. No. 07/168,284, filed Mar. 15, 1988, now abandoned, all in the names of Michael K. Aghajanian and Marc S. Newkirk and entitled "Metal Matrix Composites and Techniques for Making the Same." In accordance with the methods disclosed in this copending U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned U.S. Pat. No. 5,249,621, which issued Oct. 5, 1993, in the names of Aghajanian et al. and entitled "Method of Forming Metal Matrix Composite Bodies by a Spontaneous Infiltration Process and Products Produced Therefrom" from U.S. patent application Ser. No. 07/863,894, filed Apr.6, 1992, which is a continuation application of U.S. patent application Ser. No. 07/521,043, filed May 9, 1990, now abandoned, which is a continuation-inpart of U.S. patent application Ser. No. 07/484,753, filed Feb. 23, 1990, now abandoned, which was a continuation-in-part of U.S. patent application Ser. No. 07/432,661, filed Nov. 7, 1989, now abandoned, which was a continuation-in-part of U.S. patent application Ser. No. 07/416,327, filed Oct. 6, 1989, now abandoned, which was a continuation-in-part of U.S. patent application Ser. No. 07/349,590, filed May 9, 1989 (now abandoned), which was a continuation-in-part of U.S. patent application Ser. No. 07/269,311, filed Nov. 10, 1988, now abandoned, in the names of Michael K. Aghajanian et al. and entitled "A Method of Forming Metal Matrix Composite Bodies by a Spontaneous Infiltration Process, and Products Produced Therefrom". According to this Aghajanian et al. invention, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian, et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian, et al. applications that the spontaneous infiltration behavior should occur in other matrix metal/infiltration enhancer precursor/infiltrating atmosphere systems.

Another related Commonly Owned and Copending U.S. patent application Ser. No. 08/083,823, filed on Jun. 28, 1993, which is a continuation of Commonly Owned U.S. Pat. No. 5,222,542, which issued Jun. 29, 1993, which is a continuation-in-part of U.S. patent application Ser. No. 07/269,308, filed Nov. 10, 1988, which issued to U.S. Pat. No. 5,000,247 on Mar. 19, 1991, and naming as sole inventor John Thomas Burke and entitled "Method For Forming Metal Matrix Composite Bodies With A Dispersion Casting Technique and Products Produced Thereby". These patent applications and patents relate to a novel method for forming metal matrix composite bodies. A permeable mass of filler material is spontaneously infiltrated by a molten matrix metal. Particularly, an infiltration enhancer and/or an infiltration enhancer precursor and/or an infiltrating atmosphere are in communication with the filler material, at least at some point during the process, which permits molten matrix metal to spontaneously infiltrate the filler material. After infiltration has been completed to a desired extent, additional matrix metal is added to that matrix metal which has spontaneously infiltrated the filler material to result in a suspension of filler material and matrix metal having a lower volume fraction of filler relative to matrix metal. The matrix metal then can be permitted to cool in situ or the mixture of matrix metal and filler material can be poured into a second container as a casting process to form a desired shape which corresponds to the second container. However, the formed suspension, whether cast immediately after being formed or after cooling and thereafter heating and casting, can be pour cast into a desired shape while retaining beneficial characteristics associated with spontaneously infiltrated metal matrix composites.

A novel method of forming a metal matrix composite by infiltration of a permeable mass of filler contained in a ceramic matrix composite mold is disclosed in Commonly Owned U.S. Pat. No. 4,998,578, which issued on Mar. 12, 1991, from U.S. patent application Ser. No. 07/380,977, filed on Jul. 17, 1989, as a continuation of U.S. Pat. No. 4,871,008, which issued on Oct. 3, 1989, from U.S. patent application Ser. No. 07/142,385, filed Jan. 11, 1988, by Dwivedi et al., both entitled "Method of Making Metal Matrix Composites". According to the method disclosed in the Dwivedi et al. Patents, a mold is formed by the directed oxidation of a molten precursor metal or parent metal with an oxidant to develop or grow a polycrystalline oxidation reaction product which embeds at least a portion of a preform comprised of a suitable filler (referred to as a "first filler") to form a ceramic matrix composite mold. The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patents describe a method for the production of a metal matrix composite body, which may be bonded to a ceramic matrix composite body, and the novel bodies which are produced therefrom.

A method of forming macrocomposite bodies by a somewhat related process is disclosed in Commonly Owned and Copending U.S. patent application Ser. No. 07/966,124, filed on Oct. 23, 1992, as a continuation of U.S. patent application Ser. No. 07/747,213, filed on Aug. 19, 1991 (now abandoned), as a continuation of U.S. patent application Ser. No. 07/269,464, which was filed on Nov. 10, 1988, and issued as U.S. Pat. No. 5,040,588 on Aug. 20, 1991, in the names of Marc S. Newkirk et al., and entitled "Methods for Forming Macrocomposite Bodies and Macrocomposite Bodies Produced Thereby". A continuation of U.S. Pat. No. 5,040,588, was filed on Aug. 19, 1991, as U.S. patent application Ser. No. 07/747,213, now abandoned. These applications and Patent disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process is disclosed in Commonly Owned and Copending U.S. patent application Ser. No. 08/085,575, filed on Jul. 1, 1993, as a continuation of Commonly Owned U.S. Pat. No. 5,224,533, which issued on Jul. 6, 1993, which was filed on May 22, 1992, as U.S. patent application Ser. No. 07/888,241, as a continuation of U.S. patent application Ser. No. 07/381,523, filed on Jul. 18, 1989, now abandoned, in the names of Robert C. Kantner et al., and entitled "A Method of Forming Metal Matrix Composite Bodies by a Self-Generated Vacuum Process, and Products Produced Therefrom". These patent applications and patent disclose a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

A method of forming macrocomposite bodies by a somewhat related process is disclosed in Commonly Owned and Copending U.S. patent application Ser. No. 08/021,297, filed on Feb. 22, 1993, as a divisional of Commonly Owned U.S. Pat. No. 5,247,986, entitled "A Method of Forming Macrocomposite Bodies by Self-Generated Vacuum Techniques, and Products Produced Therefrom" which issued Sep. 28, 1993, in the names of Robert C. Kantner et al. from U.S. patent application Ser. No. 07/824,686, filed on Jan. 21, 1992, which was filed as a continuation of U.S. patent application Ser. No. 07/383,935 (now abandoned); and U.S. Pat. No. 5,188,164, issued Feb. 23, 1993, in the names of Robert C. Kantner et al. and entitled "A Method of Forming Macrocomposite Bodies by Self-Generated Vacuum Techniques using a Glassy Seal" from U.S. patent application Ser. No. 07/560,746, filed on Jul. 31, 1990, which was filed as a continuation of U.S. patent application Ser. No. 07/383,935 (now abandoned); in the names of Robert C. Kantner et al., and entitled "A Method of Forming Macrocomposite Bodies By Self-Generated Vacuum Techniques, and Products Produced Therefrom". These patent applications and patents disclose a method whereby a molten matrix metal is contacted with a filler material or a preform, optionally in contact with a second or additional body, in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. The infiltrated material may be bonded to the carcass of the matrix metal and/or the second or additional body thereby forming a macrocomposite body. Such self-generated vacuum infiltration occurs without the application of any external pressure or vacuum.

Methods of forming shaped metal matrix composite bodies by a self-generated vacuum process are disclosed in Commonly Owned and Copending U.S. patent application Ser. No. 07/803,769, filed on Dec. 5, 1991, which is a continuation of U.S. patent application Ser. No. 07/520,915, which was filed on May 9, 1990, now abandoned, in the names of Aghajanian et al., and entitled "Method of Making Metal Matrix Composite Bodies With Use of A Barrier" and commonly owned and copending International Application No. PCT/US91/03232, filed on May 9, 1991, claiming priority to U.S. patent application Ser. No. 07/520,915, and entitled "Barrier Materials For Making Metal Matrix Composites". These applications describe methods for making a metal matrix composite produced by spontaneously infiltrating a molten matrix metal into a permeable mass of filler material or a preform having at least one surface boundary established or defined by a barrier means. Specifically, an infiltration enhancer and/or an infiltration enhancer precursor and/or an infiltrating atmosphere are in communication with the filler material or preform, at least at some point during the process, which permits molten matrix metal to spontaneously infiltrate the filler material or preform up to the barrier material. A barrier material, typically, inhibits the transport of molten matrix metal beyond itself, thereby permitting the formation of shaped metal matrix composite bodies.

The barrier means disclosed in these applications may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement of the molten matrix metal beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

The barrier materials of these applications may be a physical barrier (e.g., colloidal graphite, certain glass-forming materials, etc.), a reactive barrier (e.g., calcium carbonate, aluminum phosphate, colloidal silica, etc.), or any combination of the two (e.g., Grade A-17 alumina having an average particle size of about 3.5 microns obtained from Alcoa Industrial Products, Bauxite, AR). The barrier material should prevent the molten matrix metal from infiltrating beyond the desired boundaries of the filler material or preform and, preferably, provide a smooth surface finish to the final metal matrix composite body. Further, the barrier should not react or dissolve into the molten matrix metal or the filler material, unless such behavior is desired, e.g., when a reactive barrier is utilized. Any material or combination of materials which satisfy the above-described criteria for a particular matrix metal/infiltration enhancer and/or infiltration enhancer precursor and/or infiltrating atmosphere/filler material system may be utilized as a barrier material in that system.

The subject matter of this application is also related to that of several commonly owned ceramic and ceramic composite Patents and commonly owned and copending ceramic and ceramic composite Patent Applications. Particularly, these Patents and Patent Applications describe novel methods for making ceramic and ceramic matrix composite materials (hereinafter sometimes referred to as "Commonly Owned Ceramic Matrix Patent Applications and Patents").

A novel approach to the formation of ceramic materials is disclosed generically in Commonly Owned U.S. Pat. No. 4,713,360, which issued on Dec. 15, 1987, in the names of Marc S. Newkirk et al. and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials", a European counterpart to which was published in the EPO on Jan. 22, 1986.

A novel method for producing a self-supporting ceramic composite by growing an oxidation reaction product form a parent metal into a permeable mass of filler is disclosed in commonly owned and copending U.S. patent application Ser. No. 08/017,940, filed Feb. 16, 1993, as a continuation of U.S. patent application Ser. No. 07/659,473, filed Feb. 25, 1991, which issued as U.S. Pat. No. 5,187,130 on Feb. 16, 1993, which in turn was a continuation of U.S. patent application Ser. No. 07/415,180, filed Sep. 29, 1989 (now abandoned), as a divisional of U.S. patent application Ser. No. 07/265,835, filed on Nov. 1, 1989, as a continuation of U.S. patent application Ser. No. 07/659,473, which issued as Copending U.S. Pat. No. 4,916,113, on Apr. 10, 1990, and entitled "Methods of Making Composite Articles Having Embedded Filler" which is a continuation of U.S. Pat. No. 4,851,375, issued Jul. 25, 1989, and entitled "Composite Ceramic Articles and Methods of Making the Same" all in the names of Marc S. Newkirk, et al. which was a continuation-in-part of U.S. patent application Ser. No. 06/697,876, which was filed on Feb. 4, 1985 (now abandoned).

A method for producing ceramic composite bodies having a predetermined geometry or shape is disclosed in Commonly Owned and Copending U.S. patent application Ser. No. 07/973,808, filed on Nov. 9, 1992, as a continuation of U.S. patent application Ser. No. 07/659,481, filed Feb. 25, 1991, which issued as Commonly Owned U.S. Pat. No. 5,162,273, on Nov. 10, 1992. Moreover, U.S. Pat. No. 5,162,273, issued from a continuation application of U.S. patent application Ser. No. 07/368,484, filed Jun. 19, 1989 (now abandoned), which is a continuation of U.S. patent application Ser. No. 06/861,025, filed May 8, 1986 (now abandoned). In accordance with the method in these U.S. Patent Applications, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/659,523, filed Feb. 22, 1991 (now abandoned), which is a continuation of U.S. patent application Ser. No. 07/295,488 (now abandoned) filed Jan. 10, 1989, which is a continuation of U.S. Pat. No. 4,923,832, which issued May 8, 1990, both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. Pat. No. 5,051,382, which issued Sep. 24, 1991, from U.S. patent application Ser. No. 07/329,794, filed Mar. 28, 1989, which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

The feeding of additional molten parent metal from a reservoir has been successfully utilized to produce thick ceramic matrix composite structures. Particularly, as disclosed in Commonly Owned U.S. Pat. No. 4,918,034, issued Apr. 17, 1990, which is a continuation-in-part of U.S. Pat. No. 4,900,699, issued Feb. 13, 1990, both in the names of Marc S. Newkirk et al., and entitled "Reservoir Feed Method of Making Ceramic Composite Structures and Structures Made Thereby", a European counterpart to which was published in the EPO on Mar. 30, 1988, the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. Pat. No. 5,017,533, which issued on May 21, 1991, from U.S. application Ser. No. 07/389,506, filed on Aug. 2, 1989, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby".

Moreover, U.S. patent application Ser. No. 07/904,739, filed on Jun. 26, 1992, as a continuation-in-part application of U.S. Ser. No. 07/793,933, filed on Nov. 14, 1991, which issued on Feb. 9, 1993, as U.S. Pat. No. 5,185,303, which was filed on Aug. 16, 1990, as a continuation of U.S. application Ser. No. 07/568,618, which in turn issued as U.S. Pat. No. 5,066,618 on Nov. 19, 1991, from a continuation of U.S. application Ser. No. 07/269,152, filed No. 07/269,152, filed Nov. 9, 1988 (now abandoned), which is a continuation of U.S. Pat. No. 4,818,734, which issued Apr. 4, 1989 from U.S. patent application Ser. No. 07/152,518, filed Feb. 5, 1988, in the names of Robert C. Kantner et al., which was a Continuation-in-Part Application of the above-mentioned Ser. No. 06/908,454, filed Sep. 17, 1986, having the same title and also being Commonly Owned. These Patents and the above-mentioned U.S. Application 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum, silicon) is heated to an elevated temperature above its melting point but below the melting point of the oxidation reaction product (e.g., aluminum oxide, aluminum nitride, silicon nitride, etc.) to form a body of molten parent metal which reacts upon contact with an oxidant (e.g., an oxygen containing atmosphere, a nitrogenous atmosphere, etc.) to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product when contacted with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and nitrogen as the oxidant, dopants such as strontium, silicon, nickel and magnesium, to name but a few of a larger class of dopant materials, can be alloyed with aluminum, and the created growth alloy is utilized as the parent metal. The resulting oxidation reaction product of such a growth alloy, in the case of using nitrogen as an oxidant, comprises aluminum nitride.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

The entire disclosures of the above-described commonly owned patents and patent applications are expressly incorporated herein by reference.

Definitions

As used in the present specification and the appended claims, the terms below are defined as follows:

"Alloy Side", as used herein, refers to that side of a metal matrix composite or ceramic matrix composite which initially contacted molten metal before that molten metal infiltrated the permeable mass of filler material or preform.

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein in conjunction with the formation of metal matrix composites by a self-generated vacuum technique, refers to the atmosphere outside the filler material or preform and the impermeable container. It may have substantially the same constituents as the reactive atmosphere, or it may have different constituents.

"Balance Non-Oxidizing Gas", as used herein in conjunction with the formation of metal matrix composites by a spontaneous infiltration technique, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein in conjunction with the formation of metal matrix composites, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Barrier" or "barrier means", as used herein in conjunction with the formation of ceramic matrix composites, may be any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Bonded", as used herein in conjunction with metal matrix composites, means any method of attachment between two bodies. The attachment may be physical and/or chemical and/or mechanical. A physical attachment requires that at least one of the two bodies, usually in a liquid state, infiltrates at least a portion of the microstructure of the other body. This phenomenon is commonly known as "wetting". A chemical attachment requires that at least one of the two bodies chemically react with the other body to form at least one chemical bond between the two bodies. One method of forming a mechanical attachment between the two bodies includes a macroscopic infiltration of at least one of the two bodies into the interior of the other body. An example of this would be the infiltration of at least one of the two bodies into a groove or slot on the surface of the other body. Such mechanical attachment does not include microscopic infiltration or "wetting" but may be used in combination with such physical attachment techniques.

An additional method of mechanical attachment includes such techniques as "shrink fitting", wherein one body is attached to the other body by a pressure fit. In this method of mechanical attachment, one of the bodies would be placed under compression by the other body.

"Bronze", as used herein, means and includes a copper rich alloy, which may include iron, tin, zinc, aluminum, silicon, beryllium, manganese and/or lead. Specific bronze alloys include those alloys in which the proportion of copper is about 90% by weight, the proportion of silicon is about 6% by weight, and the proportion of iron is about 3% by weight.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body}derived from a parent metal, or reduced from an oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Dopants", as used herein in conjunction with ceramic matrix composites, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein in conjunction with both ceramic matrix composites and metal matrix composites, is intended to include either single constituents or mixtures of constituents which are substantially non-reactive with and/or of limited solubility in the matrix or parent metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide, as fibers, chopped fibers, particulates, whiskers, bubbles, spheres, fiber mats, or the like, and coated fillers such as carbon fibers coated with alumina or silicon carbide to protect the carbon from attack, for example, by a molten aluminum matrix metal. Fillers may also include metals.

"Impermeable Container", as used herein, in conjunction with the formation of metal matrix composites by a self-generated vacuum technique, means a container which may house or contain a reactive atmosphere and a filler material (or preform) and/or molten matrix metal and/or a sealing means and/or at least a portion of at least one second material, under the process conditions, and which is sufficiently impermeable to the transport of gaseous or vapor species through the container, such that a pressure difference between the ambient atmosphere and the reactive atmosphere can be established.

"Infiltrating Atmosphere", as used herein, in conjunction with the formation of metal matrix composites by a spontaneous infiltration technique, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, in conjunction with the formation of metal matrix composites by a spontaneous infiltration technique, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the filler material or preform, and/or matrix metal and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal.

"Infiltration Enhancer Precursor" or "Precursor to the Infiltration Enhancer", as used herein, in conjunction with the formation of metal matrix composites by a spontaneous infiltration technique, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact within the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or, in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Macrocomposite" or "Macrocomposite Body", as used herein in conjunction with metal matrix composites, means any combination of two or more materials selected from the group consisting of a ceramic matrix body, a ceramic matrix composite body, a metal body, and a metal matrix composite body, which are intimately bonded together in any configuration, wherein at least one of the materials comprises a metal matrix composite body. The metal matrix composite body may be present as an exterior surface and/or as an interior surface. Further, the metal matrix composite body may be present as an interlayer between two or more of the materials in the group described above. It should be understood that the order, number, and/or location of a metal matrix composite body or bodies relative to residual matrix metal and/or any of the materials in the group discussed above, can be manipulated or controlled in an unlimited fashion.

"Matrix Metal" or "Matrix Metal Alloy", as used herein means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, in conjunction with the formation of metal matrix composites by a spontaneous infiltration technique, refers to that combination of materials which exhibits spontaneous infiltration into a preform or filler material. It should be understood that whenever a "/" appears between an exemplary matrix metal, infiltration enhancer precursor and infiltrating atmosphere that, the "/" is used to designate a system or combination of materials which, when combined in a particular manner, exhibits spontaneous infiltration into a preform or filler material.

"Maximum Operating Temperature" or "MOT", as used herein, is related to the predominant failure mode of composite rotors (e.g., metal matrix composite rotors) which is by surface scuffing. As a rotor is subjected to progressively more severe conditions, the temperature of the rotor continues to rise until it reaches a temperature at which the glaze on the rotor surface breaks down and scuffing ensues. The temperature at which the breakdown occurs is referred to as the maximum operating temperature (MOT). The breakdown of a rotor is accompanied by excessive noise, sparks and dust. The rotor breakdown may be followed by rapid wear of the pads and a rise in temperature measured by the pad thermocouples. The MOT is primarily dependent on the material composition and not on the rotor design or the test conditions.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal or from the parent metal means a metal which does not contain, as a primary constituent, the same metal as the matrix or parent metal (e.g., if the primary constituent of the matrix metal is aluminum, the "different" metal could have a primary constituent of, for example, nickel).

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Parent Metal", as used herein, means that metal(s) (e.g., aluminum, silicon, titanium, tin, zirconium, etc.) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.go, aluminum, etc.), the metal identified should be read with this definition in mind unless indicated otherwise by the context.

"Nonreactive Vessel for Housing Matrix Metal", as used herein, in conjunction with the formation of metal matrix composites by a spontaneous infiltration technique, means any vessel which can house or contain molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Preform" or "Permeable Preform", as used herein in conjunction with both metal matrix composite and ceramic matrix composite materials, means a porous mass of filler or filler material which is manufactured with at least one surface boundary which essentially defines a boundary for infiltrating matrix metal, such mass retaining sufficient shape integrity and green strength to provide dimensional fidelity without any external means of support prior to being infiltrated by the matrix metal. The mass should be sufficiently porous to permit infiltration of the matrix metal. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reaction System", as used herein, in conjunction with the formation of metal matrix composites by a self-generated vacuum technique, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, in conjunction with the formation of metal matrix composites by a self-generated vacuum technique, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reservoir", as used herein in conjunction with both metal matrix composite and ceramic matrix composite materials, means a separate body of metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein in conjunction with the formation of metal matrix composites by a self-generated vacuum technique, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein in conjunction with the formation of metal matrix composites by a self-generated vacuum technique, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Second Body" or "Additional Body", as used herein, means another body which is capable of being bonded to a metal matrix composite body by at least one of a chemical reaction and/or a mechanical or shrink fit. Such a body includes traditional ceramics such as sintered ceramics, hot pressed ceramics, extruded ceramics, etc., and also, non-traditional ceramic and ceramic composite bodies such as those produced by the methods described in Commonly Owned U.S. Pat. No. 4,713,360, which issued on Dec. 15, 1987, in the names of Marc S. Newkirk et al.; Commonly Owned U.S. Pat. No. 4,851,375, which issued on Jul. 25, 1989, from U.S. patent application Ser. No. 819,397, filed Jan. 17, 1986 in the names of Marc S. Newkirk et al. and entitled "Composite Ceramic Articles and Methods of Making Same"; Commonly Owned U.S. Pat. No. 5,017,526, which issued on May 21, 1991, from U.S. patent application Ser. No. 07/338,471, filed Apr. 14, 1989, as a continuation of U.S. patent application Ser. No. 861,025, filed May 8, 1986 in the names of Marc S. Newkirk et al. and entitled "Shaped Ceramic Composites and Methods of Making the Same"; Commonly Owned U.S. Pat. No. 4,818,734, which issued on Apr. 4, 1989, from U.S. patent application Sr. No. 152,518 filed on Feb. 5, 1988 in the names of Robert C. Kantner et al. and entitled "Method For In Situ Tailoring the Metallic Component of Ceramic Articles and Articles Made Thereby"; Commonly Owned U.S. Pat. No. 4,940,679, which issued on Jul. 10, 1990, from U.S. patent application Ser. No. 137,044, filed Dec. 23, 1987 in the names of T. Dennis Claar et al. and entitled "Process for Preparing Self-Supporting Bodies and Products Made Thereby"; and variations and improvements on these processes contained in other Commonly Owned U.S. Patent Applications and Patents. For the purpose of teaching the method of production and characteristics of the ceramic and ceramic composite bodies disclosed and claimed in these commonly owned applications and Patents, the entire disclosures of the above-mentioned applications and Patents are hereby incorporated by reference. Moreover, the second or additional body of the instant invention also includes metal matrix composites and structural bodies of metal such as high temperature metals, corrosion resistant metals, erosion resistant metals, etc. Accordingly, a second or additional body includes a virtually unlimited number of bodies.

"Second Material", as used herein, refers to a material selected from the group consisting of a ceramic matrix body, a ceramic matrix composite body, a metal body, and a metal matrix composite body.

"Spontaneous Infiltration", as used herein, means that the infiltration of matrix metal into the permeable mass of filler or preform occurs without requirement for the application of pressure or vacuum (whether externally applied or internally created).

"Wetting Enhancer", as used herein in conjunction with the formation of metal matrix composites by a self-generated vacuum technique, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

SUMMARY OF THE INVENTION

The present invention comprises improved materials useful as, for example, brake rotors and clutch plates for ground vehicles. Specifically, the present invention comprises substrate brake rotor and clutch plate materials that are coated within an appropriate material by an appropriate process to result in a lower metal content at or near the friction surfaces thereof. It should be noted that this application focusses primarily on brake rotors and clutch plates, however, an artisan of ordinary skill will understand that other acceptable similar uses are possible, even though such uses are not discussed expressly herein.

Specifically, by providing a second material as a coating on an appropriate substrate material (e.g., metals or metal matrix composites) a surface enhancement of the brake rotors and clutch plates is achieved. This type of surface enhancement may result in the formation of a physical barrier which prevents scuffing and/or scarring which normally would occur on a softer material. Moreover, this surface enhancement may result in the production of a thermal barrier which at least partially thermally insulates a lower melting substrate from high heat generated by, for example, frictional forces.

Accordingly, it is believed that the overall performance level of metals and metal matrix composites utilized as materials for brake rotors and clutch plates is significantly enhanced by placing one or more specific coating(s) thereon.

Desirable coating methods useful for practicing the present invention include anodizing techniques, plasma spraying techniques, flame spraying techniques, electrolytic coating techniques, dip coating techniques and the use of preceramic polymer based coatings. While each of these techniques has specific advantages and disadvantages, common to each of the techniques is the resultant coating which provides desirable surface properties which differs from one or more properties of the substrate material itself. The coating also should be capable of adhering to the substrate material under conditions which are typical for the operation of the article.

The desirable thickness of such coatings will vary depending upon the particular application (e.g., environmental conditions) to which the article will be exposed. For example, with regard to brake rotors, if the substrate material comprises aluminum or an aluminum metal matrix composite, desirable coating thicknesses should be from about 5 microns to about 200 microns. However, the coating thickness needs to be analyzed with regard to several factors including amount of thermal insulation provided by the coating, the ability of the coating to adhere to the substrate (e.g., the thermal expansion coefficients of the substrate and the coating should be similar (i.e., not differ by more than about 5–50 percent, etc. In this regard, depending on a particular application and the materials involved, the performance of the brake rotor and clutch plate can be a function of the thickness of the coating on the substrate materials.

It should be recognized that a complex interrelationship of properties is difficult to quantify with respect to rating the performance of brake rotors and clutch plates, however, one item which is readily quantifiable for brake rotors and clutch plates is the Maximum Operating Temperature which a material can experience. For example, under a given set of testing conditions, every brake rotor can be caused to fail and the temperature at which such rotor fails gives an indication of which application (e.g., front brake rotor or back brake rotor for automobiles) the rotor is suited for. Rotors of the present invention utilizing aluminum and/or aluminum metal matrix composites as substrates with appropriate coatings thereon readily achieved MOT's of 1000° F. (538° C.) and above. These MOT's having never before been achieved by prior art rotors having similar compositions to the substrate compositions of the present invention. Accordingly, the present invention is a significant achievement in the rotor art (as well as in the clutch plate art because similar considerations apply) because weight savings can be achieved without sacrificing performance.

The predominant failure mode of composite material brake rotors and particularly metal matrix composite brake rotors is by surface scuffing. As a brake rotor is subjected to progressively more severe conditions (e.g., high inertial loads), the temperature of the brake rotor continues to rise until it reaches a temperature at which a glaze (typically formed on the rubbing surfaces of the rotor at preburnish, for example, as Section 6.3 Preburnishment of SAE J212) on the rotor surface breaks down and scuffing ensues. The temperature at which the breakdown occurs is referred to as the Maximum Operating Temperature or MOT. The breakdown of a rotor accompanies excessive noise, sparks and dust. The rotor breakdown is followed by rapid wear of the pads and a rise in temperatures measured by the pad thermocouples (as discussed further below). The Maximum Operating Temperature or MOT is primarily dependent on the material composition and not on the rotor design or the test conditions.

The Maximum Operating Temperature or MOT of a material formed as a brake rotor or disc is determined using dynamometer tests adopted from SAE J212, "Brake System Dyanamometer Test Procedure" - Passenger Cars - SAE J212 JUN80, SAE 1980 (which is herein incorporated by reference), with some modifications. These tests are discussed in greater detail later herein.

In addition, certain rotor formulations relating to the present invention achieve performances never before thought to be obtainable with conventional materials.

DETAILED DESCRIPTION OF THE INVENTION AND PREFERRED EMBODIMENTS

Figure 1:
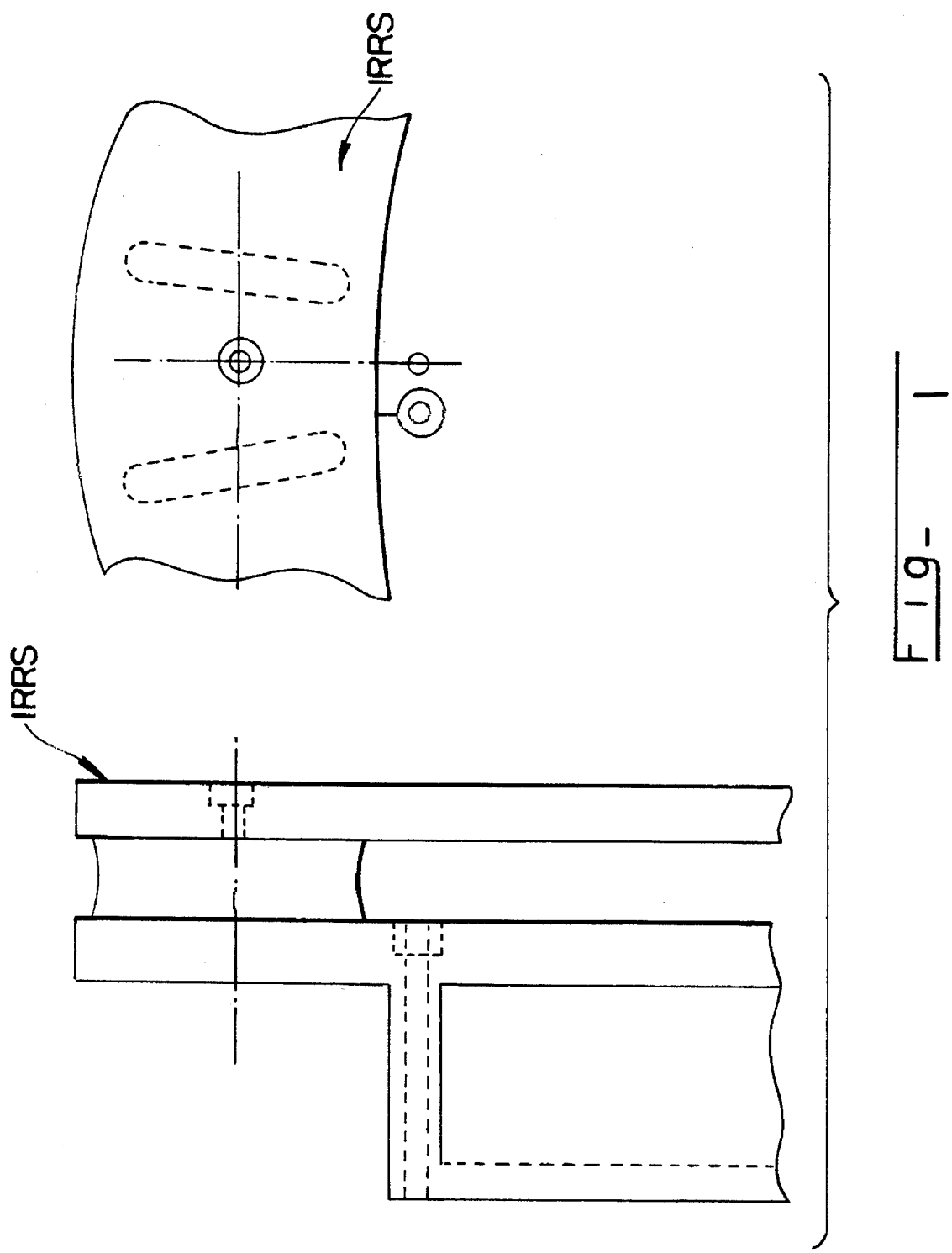
FIG. 1 is a schematic of the thermocouple placement in the rotor during the determination of the MOT and corresponds to a vented front brake rotor for the 1991 model year Ford Escort.

The present invention comprises improved materials useful as, for example, brake rotors and clutch plates for ground vehicles. Specifically, the present invention comprises substrate brake rotor and clutch plate materials that are coated with an appropriate material by an appropriate process to result in a lower metal content at or near the rubbing surfaces thereof. It should be noted that this application focusses primarily on brake rotors and clutch plates, however, an artisan of ordinary skill will understand that other acceptable similar uses are possible, even though such uses are not discussed expressly herein.

Specifically, by providing a second material as a coating on an appropriate substrate material (e.g., metals or metal matrix composites) a surface enhancement of the brake rotors and clutch plates is achieved. This type of surface enhancement may result in the formation of a physical barrier which prevents scuffing and/or scarring which normally would occur on a softer material. Moreover, this surface enhancement may result in the production of a thermal barrier which at least partially thermally insulates a lower melting substrate from high heat generated by, for example, frictional forces.

Accordingly, it is believed that the overall performance level of metals and metal matrix composites utilized as materials for brake rotors and clutch plates is significantly enhanced by placing one or more specific coating(s) thereon.

Desirable coating methods useful for practicing the present invention include anodizing techniques, plasma spraying techniques, flame spraying techniques, electrolytic coating techniques, dip coating techniques and the use of preceramic polymer based coatings. While each of these techniques has specific advantages and disadvantages, common to each of the techniques is the resultant coating which provides desirable surface properties which differs from one or more properties of the substrate material itself. The coating also should be capable of adhering to the substrate material under conditions which are typical for the operation of the article.

The desirable thickness of such coatings will vary depending upon the particular application (e.g., environmental conditions) to which the article will be exposed. For example, with regard to brake rotors, if the substrate material comprises aluminum or an aluminum metal matrix composite, desirable coating thicknesses should be from about 5 microns to about 200 microns. However, the coating thickness needs to be analyzed with regard to several factors including amount of thermal insulation provided by the coating, the ability of the coating to adhere to the substrate (e.g., the thermal expansion coefficients of the substrate and the coating should be similar (i.e., not differ by more than about 5–50 percent, etc. In this regard, depending on a particular application and the materials involved, the performance of the brake rotor and clutch plate can be a function of the thickness of the coating on the substrate materials.

It should be recognized that a complex interrelationship of properties is difficult to quantify with respect to rating the performance of brake rotors and clutch plates, however, one item which is readily quantifiable for brake rotors and clutch plates is the Maximum Operating Temperature ("MOT") which a material can experience. For example, under a given set of testing conditions, every brake rotor can be caused to fail and the temperature at which such rotor fails gives an indication of which application (e.g., front brake rotor or back brake rotor for automobiles) the rotor is suited for. Rotors of the present invention utilizing aluminum and/or aluminum metal matrix composites as substrates with appropriate coatings thereon readily achieved MOT's of 1000° F. (538° C.) and above. These MOT's having never before been achieved by prior art rotors having similar compositions to the substrate compositions of the present invention. Accordingly, the present invention is a significant achievement in the rotor art (as well as in the clutch plate art because similar considerations apply) because weight savings can be achieved without sacrificing performance.

The predominant failure mode of composite material brake rotors and particularly metal matrix composite brake rotors is by surface scuffing. As a brake rotor is subjected to progressively more severe conditions (e.g., high inertial loads), the temperature of the brake rotor continues to rise until it reaches a temperature at which a glaze (typically formed on the rubbing surfaces of the rotor at preburnish, for example, as Section 6.3 Preburnishment of SAE J212) on the rotor surface breaks down and scuffing ensues. The temperature at which the breakdown occurs is referred to as the Maximum Operating Temperature or MOT. The breakdown of a rotor accompanies excessive noise, sparks and dust. The rotor breakdown is followed by rapid wear of the pads and a rise in temperatures measured by the pad thermocouples (as discussed further below). The Maximum Operating Temperature or MOT is primarily dependent on the material composition and not on the rotor design or the test conditions.

The Maximum Operating Temperature or MOT of a material formed as a brake rotor or disc is determined using dynamometer tests adopted from SAE J212, "Brake System Dyanamometer Test Procedure" - Passenger Cars - SAE J212 JUN80, SAE 1980 (which is herein incorporated by reference), with some modifications. These tests are discussed in greater detail later herein.

In addition, certain rotor formulations relating to the present invention achieve performances never before thought to be obtainable with conventional materials.

Figure 2A:
FIG. 2 is taken from SAE J212 and is a schematic of the thermocouple placement in the brake pad during the determination of the MOT.
Figure 2C:
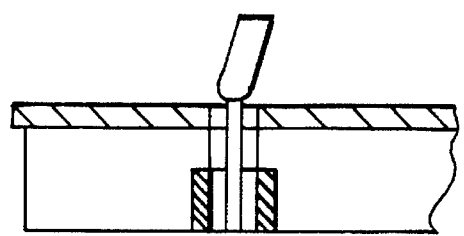
Figure 2B:
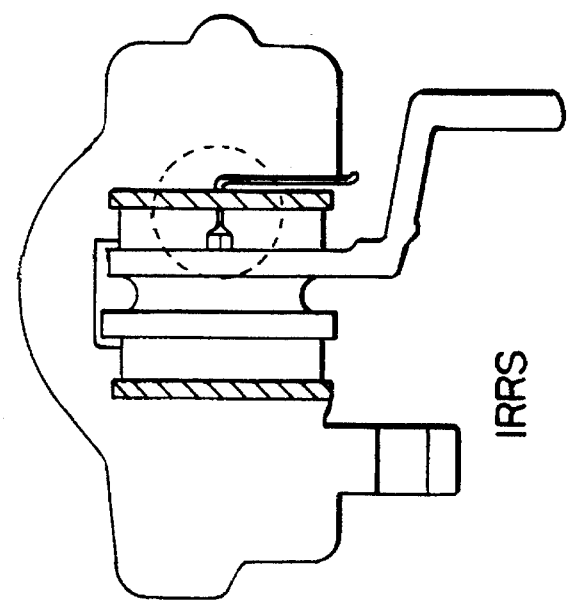

The Maximum Operating Temperature or MOT of a material as a brake rotor or disc is determined using dynamometer tests adopted from SAE J212, "Brake System Dyanamometer Test Procedure" - Passenger Cars - SAE J212 JUN80, SAE 1980 (which is herein incorporated by reference), with some modifications. The current SAE J212 test has two fade/recovery sequences, each conducted at a cooling air speed of 8 mph (12.8 km/h). In the present test, an additional fade/recovery sequence is added at a cooling air speed of 2 mph (3.2 km/h). The rubbing surface temperature of the test rotor is measured by a thermocouple located 0.040 inch (1 mm) below the surface at the center of the inboard side, since most of the failures in the metal matrix composite rotors has been determined to initiate on this side (this rubbing surface is designated as the inner rotor rubbing surface or IRRS). A second thermocouple is located at the intersection of the outer rubbing surface and the rotor hub. This thermocouple is also recessed 0.040" (1 mm) under the rotor surface. Both braking pads are fitted with thermocouples located at the center of each pad, approximately 0.040" (1 mm) under the rubbing surface. For examples of the placement of thermocouples in the brake rotor and brake pads, see FIGS. 1 and 2, respectively. FIG. 1 is a schematic of the thermocouple placement in the rotor during the determination MOT and corresponds to a vented front brake rotor for 1991 model year Ford Escort. FIG. 2 is taken from SAE J212 and is a schematic of the thermocouple placement in the brake pad during the determination of the Maximum Operating Temperature or MOT.

The Maximum Operating Temperature or MOT of a material is determined during the fade segments of the modified SAE J212 test and, therefore, the fade segments are described in detail. There are three fade segments in the test. The test conditions, except for the inertial load, during each fade segment are summarized in Table 1.

TABLE 1

| Test Conditions | Test Conditions During Fade Segments | | |
|---|---|---|---|
| Initial IRRS Temp., °F. | 150 (65.5° C.) | 150 (65.5° C.) | 150 (65.5° C.) |
| Initial Speed, mph | 60 (97 km/h) | 60 (97 km/h) | 60 (97 km/h) |
| Deceleration, ft/s$^2$ | 15 (4.6 m/s$^2$) | 15 (4.6 m/s$^2$) | 15 (4.6 m/s$^2$) |
| No. of stops | 10 | 15 | 15 |
| Cycle Time, s | 35 | 35 | 35 |
| Cooling Air Speed, mph | 8 (12.8 km/h) | 8 (12.8 km/h) | 2 (12.8 km/h) |

An inertial load of at least that specified by Section 5.7, "Test Moment of Inertia" of SAE J212 is used during the determination of Maximum Operating Temperature or MOT for a particular rotor material. If that inertial load is insufficient to cause the failure of the rotor a higher inertial load is applied on the rotor until failure is observed. The temperature measured at failure corresponds to Maximum Operating Temperature or MOT.

The tests for determining Maximum Operating Temperature or MOT are conducted using compact dynamometers, for example, with DC drives and at commercial laboratories (e.g., Link Testing Laboratory and Greening Testing Laboratory). The speed, acceleration (or deceleration), torque, cooling air speed, cooling air temperature, rotor and pad temperatures are continuously monitored and recorded.

Before a test to determine the Maximum Operating Temperature or MOT of a rotor material, the rotor and the mating pads are thoroughly characterized for:

1. weight
2. dimensions, particularly the rotor thickness
3. surface roughness
4. density
5. microstructure and reinforcement loading Substrate metal matrix composite materials can be fabricated according to any of the metal matrix composite formation techniques discussed above herein. However, preferred techniques for forming the metal matrix composite substrate portions can be found in the Examples set forth in U.S. patent application Ser. No. 08/127,655, which was filed on Sep. 27, 1993, in the names of Dwivedi et al., and entitled "Brake Rotors and Methods For Making The Same", the subject matter of which is herein incorporated by reference.

One preferred technique for forming a desirable coating on a substrate metal matrix composite material is an anodizing technique. Specifically, U.S. Pat. No. 5,225,069, which issued on Jul. 6, 1993, in the names of Haupt et al. and entitled "Process for the Production for Oxide Ceramic Surface Films on Silicon-Containing Light Metal Cast Alloys" disclosed a desirable coating method. Particularly, this patent discloses an anodizing procedure which results in the production of oxide ceramic surface films on substrate metals. The resultant surface films provide desirable properties for the brake rotors and clutch plates of the present invention. The subject matter of U.S. Pat. No. 5,225,069 is herein expressly incorporated by reference.

It has been unexpectedly discovered that by placing a desirable coating (e.g., an anodized layer according to U.S. Pat. No. 5,225,069) on an aluminum metal matrix composite reinforced with a silicon carbide filler layer results in unexpected desirable performance as a brake rotor. Specifically, by forming an anodized layer having an approximate thickness of about 10 microns a desirable brake rotor and/or clutch plate can be formulated.

What is claimed is:

1. An article selected from the group consisting of a brake rotor and a clutch plate comprising:

a substrate comprising metal; and a coating disposed on at least a frictional contact portion of said substrate, said coating comprising a preceramic polymer.

2. An article selected from the group consisting of a brake rotor and a clutch plate, comprising:

a substrate comprising a metal matrix composite material; and a coating comprising a preceramic polymer disposed on at least a frictional contact portion of said substrate.

3. The article of claim 2, wherein said coating has a thickness from about 5 to about 200 microns.

4. An article selected from the group consisting of a brake rotor and a clutch plate, comprising:

a substrate body having at least one frictional contact surface and comprising a metal matrix composite material comprising a matrix metal embedding at least one filler material, wherein at least a portion of said frictional contact surface is in an anodized condition.

5. The article of claim 4, wherein said at least one filler material comprises at least one material selected from the group consisting of aluminum oxide and silicon carbide.

6. The article of claim 4, wherein said at least one filler material comprises particulate.

7. The article of claim 4, wherein said matrix metal comprises aluminum.

8. The article of claim 7, wherein said matrix metal further comprises silicon.

9. The article of claim 7, wherein said anodized portion of said at least one frictional surface comprises aluminum oxide.

10. The article of claim 4, wherein said anodized portion of said at least one frictional surface extends from about 5 microns to about 20 microns into said substrate body.

11. The article of claim 4, wherein said matrix metal consists essentially of aluminum and magnesium.

* * * * *